United States Patent
Shaw et al.

(10) Patent No.: US 8,509,399 B2
(45) Date of Patent: Aug. 13, 2013

(54) USER PROFILE BASED SPEECH TO TEXT CONVERSION FOR VISUAL VOICE MAIL

(71) Applicants: Venson M. Shaw, Kirkland, WA (US); Robert Z. Evora, Douglasville, GA (US)

(72) Inventors: Venson M. Shaw, Kirkland, WA (US); Robert Z. Evora, Douglasville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/626,973

(22) Filed: Sep. 26, 2012

(65) Prior Publication Data

US 2013/0023287 A1  Jan. 24, 2013

Related U.S. Application Data

(63) Continuation of application No. 12/622,163, filed on Nov. 19, 2009.

(51) Int. Cl.
*H04M 11/00* (2006.01)
*H04L 29/08* (2006.01)
*H04W 4/00* (2009.01)

(52) U.S. Cl.
USPC .......... 379/88.23; 455/414.4; 455/432.2

(58) Field of Classification Search
USPC .............. 379/88.04–88.23; 704/235, 251, 704/270, 260, 275; 709/206; 455/412.1–466
See application file for complete search history.

(56) References Cited

U.S. PATENT DOCUMENTS

| | | | |
|---|---|---|---|
| 5,647,002 A | 7/1997 | Brunson | |
| 5,963,635 A * | 10/1999 | Szlam et al. | 379/309 |
| 5,978,672 A | 11/1999 | Hartmaier et al. | |
| 6,170,011 B1 * | 1/2001 | Macleod Beck et al. | 709/224 |
| 6,381,640 B1 * | 4/2002 | Beck et al. | 709/223 |
| 6,633,630 B1 | 10/2003 | Owens et al. | |
| 6,708,039 B2 * | 3/2004 | Harder | 455/466 |
| 6,775,360 B2 | 8/2004 | Davidson et al. | |
| 7,353,182 B1 * | 4/2008 | Missinhoun et al. | 705/7.12 |
| 7,545,784 B2 | 6/2009 | Mgrdechian et al. | |
| 7,580,699 B1 | 8/2009 | Shaw et al. | |
| 7,640,233 B2 | 12/2009 | Baartman et al. | |
| 7,725,098 B1 | 5/2010 | Claudatos et al. | |
| 7,912,187 B1 | 3/2011 | Mikan et al. | |
| 7,966,496 B2 * | 6/2011 | Ellmore | 713/182 |
| 2002/0154745 A1 | 10/2002 | Shtivelman | |
| 2003/0177008 A1 | 9/2003 | Chang | |
| 2004/0102957 A1 | 5/2004 | Levin | |
| 2005/0111631 A1 * | 5/2005 | Jordan, Jr. | 379/88.12 |
| 2005/0201362 A1 * | 9/2005 | Klein et al. | 370/352 |
| 2006/0025113 A1 | 2/2006 | Nguyen et al. | |
| 2006/0106614 A1 | 5/2006 | Mowatt et al. | |
| 2006/0233319 A1 * | 10/2006 | Van Zandt et al. | 379/67.1 |
| 2006/0234680 A1 | 10/2006 | Doulton | |
| 2007/0123280 A1 | 5/2007 | McGary et al. | |
| 2007/0172050 A1 * | 7/2007 | Weinstein et al. | 379/266.07 |
| 2008/0037529 A1 | 2/2008 | Bangalore et al. | |
| 2008/0133283 A1 * | 6/2008 | Backer et al. | 705/5 |

(Continued)

Primary Examiner — Mohammad Islam
(74) Attorney, Agent, or Firm — Woodcock Washburn LLP

(57) ABSTRACT

Messages in a message system are converted from one format to another format in accordance with preferred message formats and/or conditions. Message formats can include text messages, multimedia messages, visual voicemail messages, and/or other audio/visual messages. Based on conditions such as recipient device location or velocity and a preferred message format a message can be converted into an appropriate transmission format and transmitted and/or communicated to the recipient in its appropriate format (e.g., text, multimedia, audio, etc. . . . ).

20 Claims, 8 Drawing Sheets

(56) References Cited

U.S. PATENT DOCUMENTS

| | | |
|---|---|---|
| 2008/0177786 A1 | 7/2008 | Faisman et al. |
| 2008/0189162 A1* | 8/2008 | Ganong et al. .................. 705/9 |
| 2008/0205610 A1 | 8/2008 | Bishop |
| 2008/0275986 A1* | 11/2008 | Chen et al. .................. 709/224 |
| 2008/0288384 A1* | 11/2008 | Collins et al. .................. 705/35 |
| 2008/0319744 A1 | 12/2008 | Goldberg |
| 2009/0024389 A1 | 1/2009 | Khouri et al. |
| 2009/0172108 A1 | 7/2009 | Singh |
| 2009/0186700 A1* | 7/2009 | Konkle .......................... 463/42 |
| 2009/0238353 A1* | 9/2009 | Mani ....................... 379/201.02 |
| 2010/0144329 A1 | 6/2010 | Lasensky et al. |
| 2010/0217591 A1 | 8/2010 | Shpigel |
| 2011/0054977 A1* | 3/2011 | Jaffer .............................. 705/9 |
| 2011/0116610 A1 | 5/2011 | Shaw et al. |
| 2011/0123016 A1* | 5/2011 | Segall et al. ............. 379/266.07 |
| 2011/0213657 A1* | 9/2011 | O'Malley et al. .......... 705/14.49 |
| 2011/0238544 A1* | 9/2011 | Segall ............................ 705/34 |

* cited by examiner

USER PROFILE BASED SPEECH TO TEXT CONVERSION FOR VISUAL VOICE MAIL

CROSS REFERENCE TO RELATED APPLICATIONS

This application is a continuation of, and claims priority to, U.S. patent application Ser. No. 12/622,163, filed Nov. 19, 2009, entitled "User Profile Based Speech to Text Conversion for Visual Voice Mail," which issued on Jan. 22, 2013 as U.S. Pat. No. 8,358,752, the entire contents of which are hereby incorporated herein by reference.

TECHNICAL FIELD

The technical field generally relates to telecommunications and more specifically relates to messaging devices and services.

BACKGROUND

Visual voicemail (VVM) displays messages in a graphical form and allows users to choose which message to listen to, and provides options to delete, save, or manipulate messages in other ways. VVM output can display a short description of the message and caller which can include the time of the call, the length of the message, and the caller's identity among other descriptors. VVM can be used on mobile and standard landline phone networks.

Text messaging, also known as "texting," refers to the exchange of brief text messages between devices, usually mobile devices on a wireless network. Commonly text messages are sent via Short Message Service (SMS). Texting can also refer to other short messages that include multimedia such as images, audio, video as well as text. A common standard for sending multimedia messages is Multimedia Messaging Service (MMS).

SUMMARY

Methods and systems are disclosed for intelligent conversion of a message in the format of text, audio, multimedia, or combinations and variations thereof into a different message format. In an example embodiment, a message is received on a network message device which contains an intelligent message processor determines an appropriate transmission format of the message, and the intelligent message processor converts the message and transmits the converted message. For example, network message devices can be voicemail servers, short message service centers, and multimedia message service centers, to name a few.

An intelligent message processor can determine how to convert a message based on conditions and/or a preferred message format. The preferred message format can be determined by a user, administrator, carrier, or some other party. A party's preference may overrule another party's preference. Conditions can include location information, user calendars, date and time information, message length, identity of message source, network resources, bandwidth availability, velocity of recipient, battery power of a device, and/or memory constraints of a device for example. In addition, for example, a intelligent message processor and/or network message device can be based in a provider network or a local business network.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed.

DETAILED DESCRIPTION OF ILLUSTRATIVE EMBODIMENTS

Figure 1:
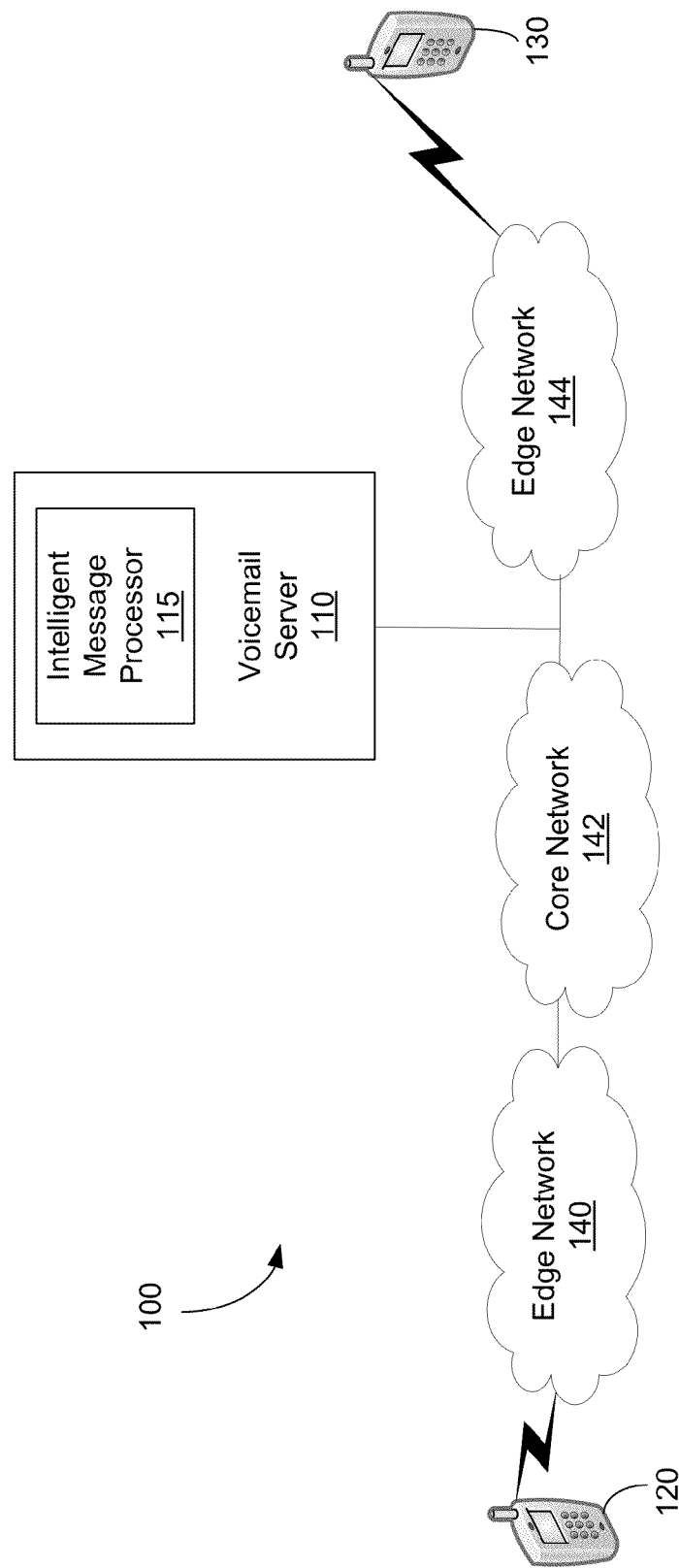
FIG. 1 is a graphical representation of an exemplary, non-limiting network in which intelligent message translation services can be implemented.

FIG. 1 illustrates a non-limiting example of a network 100 in which the present disclosure can be implemented. It should be understood that some elements have not been illustrated so as not to obscure the present disclosure. In one embodiment a voicemail server 110 on the telecommunication carrier's network can receive a voicemail message, and an intelligent message processor 115 within the voicemail server can determine an appropriate message format to transmit to a recipient. A voicemail server 110 is illustratively defined as any device that can receive a message, store a message, transmit a message, and/or do any other computing functions that allow for the intelligent forwarding of audio, text, multimedia, and other messages to a recipient or a multitude of recipients. Note that a message as described herein can be in audio, text, and/or multimedia formats. In FIG. 1, an intelligent message processor 115 is embedded within a voicemail server, but an intelligent message processor can be functionally separated into one or several different devices. For example, the functions of an intelligent message processor 115 as described within the patent application can be executed partially within a voicemail server and partially within the recipient device, such as a mobile phone, or any other computing device. Note that although FIG. 1 displays a voicemail sever the functions described within may be done by any network message device such as a short message service center, multimedia message service center, or any other device capable of executing computing functions.

A message received from a sender can be in multiple formats. A message can be audio, video, text, multimedia, or any combination thereof Conditions and preferences mentioned within the patent application are exemplary (examples/illustrations) and do not limit the invention. Messages can be received over a wireless network at a wireless device (see network 100), a wireless network at a wired device, a wired network at a wireless device, a wired network at a wired device, and any combination thereof For example, a wired device can be connected through plain old telephone service (POTS) lines to a landline telephone or a digital subscriber line to a VOIP phone. Messages can travel through multiple configurations of wired and/or wireless connections and devices that can carry analog and/or digital data.

The intelligent message processor can consider several different conditions, preferred message formats (i.e. preferences), and/or a combination thereof Preferences can be set on a mobile device, network device, on a network device through a mobile device, or set on any device that will allow communication with the intelligent message processor. Preferences can be set by the carrier, a third party, a recipient, or any other person or device that has access to change preferences.

Figure 2:
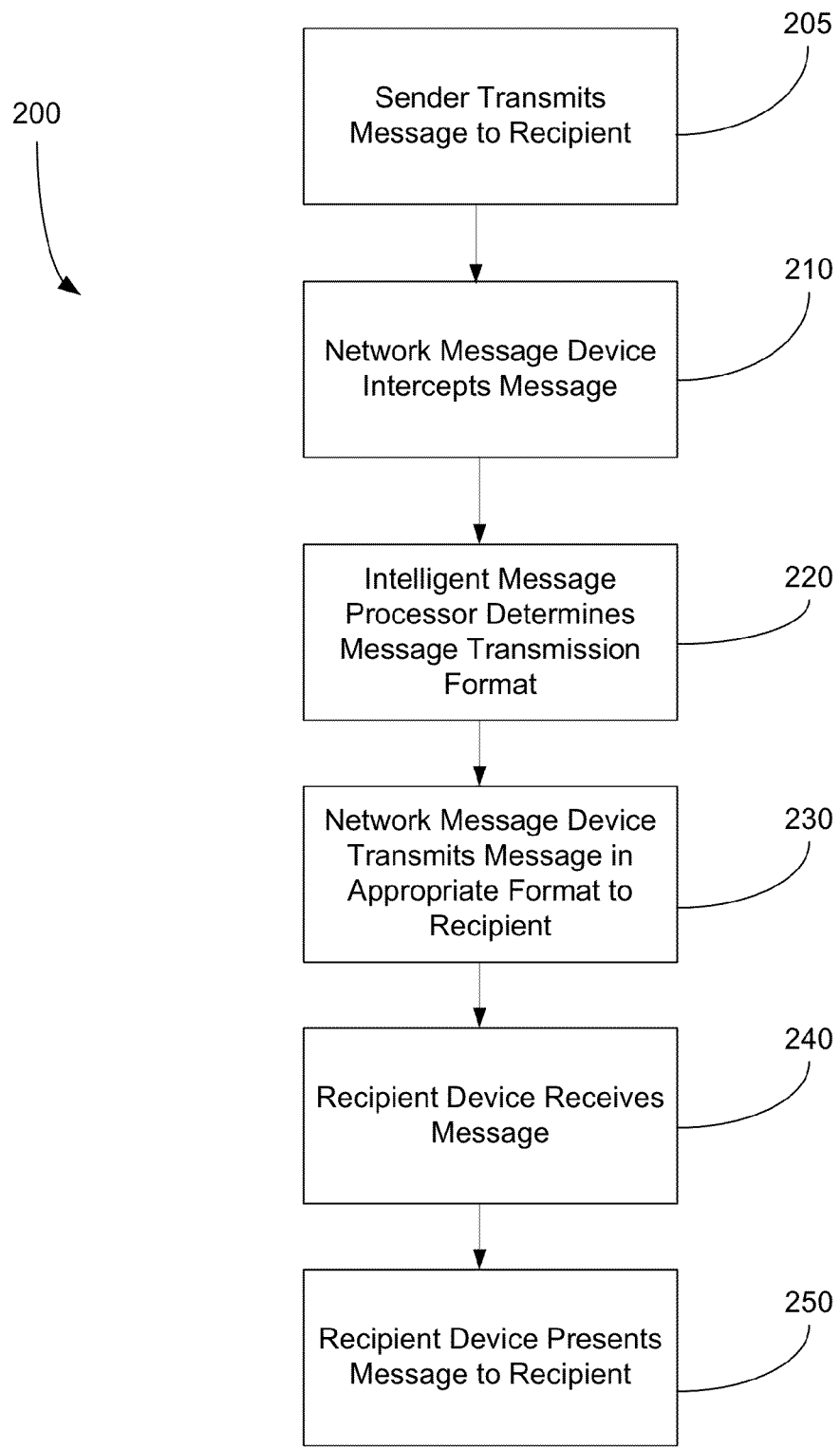
FIG. 2 illustrates a non-limiting, exemplary method of implementing intelligent message translation services using a network processing device.

In FIG. 2, method 200 of implementing aspects of the present disclosure is illustrated. Method 200 can be performed by computing equipment or devices of any type, including mobile phones, servers, or any other device that can execute computing functions.

In one embodiment at block 205, a sender transmits a message to a recipient. A network message device intercepts the message at block 210. The intelligent message processor receives a message from the network message device and can determine the format in which the message will be transmitted at block 220 before the network message device attempts to transmit the message to the recipient. The intelligent message processor can take into account many different variables in order to determine the transmission format of the message. The network message device transmits the message in an appropriate format to the recipient at block 230. A recipient device receives message at block 240 and appropriately presents the message to the recipient at block 250.

In one embodiment of method 200, at block 220, an intelligent message processor can take into account the location of the recipient in determining the message transmission format. An intelligent message processor can receive location information from the recipient device or from a network device. The recipient device or network device can determine the recipient device's location using global positioning system (GPS), assisted GPS (aGPS), detection of the proximity of the recipient device to other wireless devices such as a vehicle's Bluetooth signal, a home WiFi LAN, one or more mobile carrier's wireless antennas, or using other means. Based on the location, the intelligent message processor can determine an appropriate format. For example, if the location is determined to be a car, an intelligent message processor can determine that an audio message is appropriate. If the location, for example, is a boardroom then a text message version of the audio message can be determined to be appropriate and relayed to the recipient device.

In another embodiment, at block 220 an intelligent message processor can take into account whether another device is synched or connected to a recipient device. For example, if a Bluetooth enabled headset is wirelessly synchronized (i.e., connected) to a recipient device, then an intelligent message processor can determine that it is appropriate to send the message in an audio format. Other exemplary outputs or connections an intelligent message processor can consider include power connections, universal serial bus (USB) connections, wireless connections such as WiFi or infrared, and any other connection that can be connected with or without wires.

In one embodiment at block 220, an intelligent message processor can take into account a calendar of a recipient and general date and time information, or any other temporal information. A recipient can decide that during particular time periods a message should be sent in an audio format. For example, the recipient may typically be walking to a train station or driving home during the hours of 5:00 P.M. and 7:00 P.M. Therefore, the recipient can set a preference to have all messages sent during that time period presented in an audio format to help the recipient concentrate on the road while driving home or concentrate on walking to the train station.

In one embodiment, at block 220, an intelligent message processor can take into account the length of the message. For example, a recipient may only want to listen to messages of a certain time length. A recipient, for example, can set a preference to receive messages over 10 seconds in length in audio format and messages of less than 10 seconds in length in text format. An intelligent message processor device can take the aforementioned parameters into account and transmit a message in an appropriate format. In another example, a recipient can choose to receive a text message of less than 10 words and receive audio messages for text over 10 words. An intelligent message processor can determine the length of a text message in an audio format or the length of an original audio message in a text format using any effective means. A user can set preferences for message transmission format based on length of time, number of words or letters, or any combination thereof.

In one embodiment at block 220, an intelligent message processor can take into account that a recipient desires audio messages from a particular person or group of persons. For example, a recipient may only want audio messages from people associated with the recipient's place of work. An intelligent message processor can determine the source of the call by caller ID, phone numbers, or identifiable verbal or non-verbal codes by a sender, and determine the message format based on the source of the call.

In one embodiment at block 220, an intelligent message processor can take into account the status of network resources. Status of network resources can include bandwidth availability, traffic congestion, and/or any other status that can prevent the network from sending data at a normal rate. For example preferences of the user, network provider, or a combination of thereof can dictate whether it would be appropriate to send messages in an audio, text, or other format. For example, if there was a natural disaster which decreased network bandwidth to a low level, an intelligent message processor can determine that it would be appropriate to convert audio messages into text and transmit text messages to a recipient rather than sending audio messages or allowing a recipient to call into a voicemail system and retrieve audio messages. In another example, the intelligent message processor can be configured to use memory more efficiently because of an unexpected spike in messages and therefore convert all audio messages to text.

In one embodiment at block 220, an intelligent message processor can take into account a recipient's velocity. For example, if a device determines (e.g., via GPS, A-GPS) that a recipient is moving at or over a threshold velocity, which can indicate a recipient is driving a car, an intelligent message processor could determine that it is not appropriate for the recipient to receive a text message, and will convert the text message to an audio message or other non-visual message.

In one embodiment at block 220, an intelligent message processor can take into account battery power or memory constraints of a recipient device. For example, if a recipient device indicates low battery an intelligent message processor can determine that it would take less power for the recipient device to view a text message version of an audio message. An intelligent message processor can determine, based on user and/or network preferences, that it would be appropriate for an audio message to be converted into a text message and transmitted to a recipient. In another embodiment, if a multimedia message was originally sent, an intelligent message processor can determine that it would be better to send an audio or a text message, because of bandwidth or network and/or recipient device memory constraints.

Figure 3:
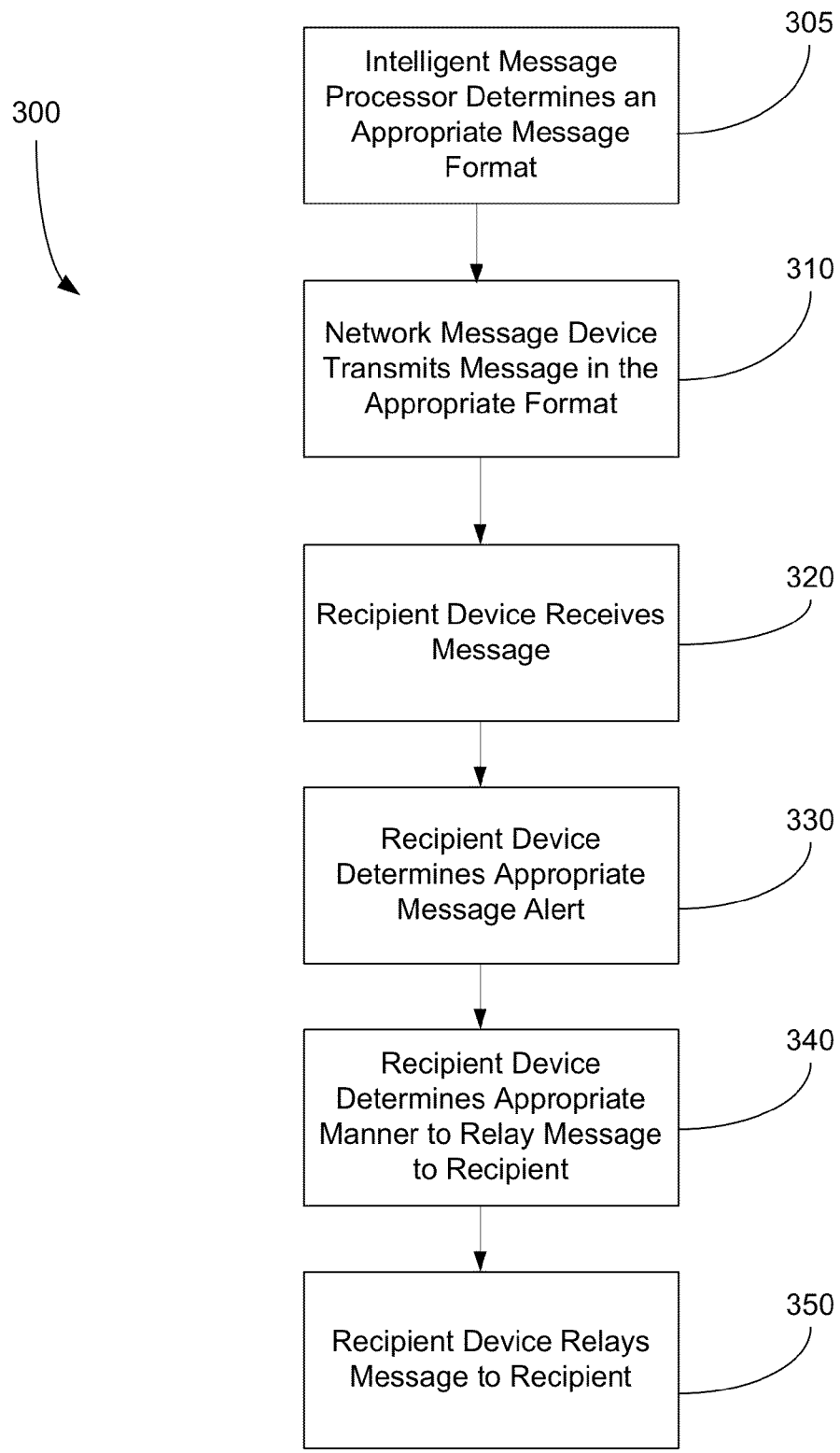
FIG. 3 illustrates a non-limiting, exemplary method of implementing intelligent message translation services using a network processing device and recipient device.

In FIG. 3, method 300 of implementing aspects of the present disclosure is illustrated. Method 300 can be performed by computing equipment or devices of any type, including mobile phones, servers, or any other device that can execute computing functions.

In one embodiment an intelligent message processor determines an appropriate message format at block 305. The network message device transmits the message in the appropriate format to a recipient device at block 310. The recipient device receives the message at block 320 and a recipient device can determine an appropriate message alert at block 330. A recipient device can determine the appropriate manner of relaying the message to a recipient at block 340. For example, an intelligent message processor can receive a message in an audio format. An intelligent message processor can be configured to send the version of a message that uses the least memory or bandwidth, which, for example, can be text. A recipient device, based on user preferences, can decide to appropriately alert a recipient at block 330. An alert can include a ring, tone, flashing LED, vibration, picture, video, and/or automatic voice prompt that allows the user to immediately interact via voice activation or manual input.

In one embodiment of method 300, if an automatic voice prompt is determined to be appropriate, a recipient device after receiving messages can ask for further recipient input. An automated audio message can state, "You have messages: 5 text and 5 voice messages. Say 'form—text' to change to all text and display on handset. Say 'listen voice' to listen to voice messages first. Say 'listen text' to listen to all text messages." In addition, for example, a text menu can also be shown on the recipient device automatically with options that can include changing audio messages to text and text to audio messages. Furthermore, for example, a recipient can have preset modes so that if the recipient verbally or non-verbally relays "x-mode" to the recipient device the recipient device could do predetermined actions such as, text to audio conversion, audio to text conversion, text messages first, audio messages first, or a combination thereof. Preset modes and other preferences can be set by the recipient, carrier, or other party.

In one embodiment of method 300, a recipient's mobile device would determine a message format to output to a recipient. In other words, the recipient's mobile device would download a message in any format (e.g. text, audio, multimedia) and the recipient device would determine in what format to display the message. For example, a message can download as a digital file onto a recipient device and output a text message, multimedia message, audio message, or a message combination thereof depending on device resources, such as battery power and/or other user preferences.

In another embodiment of method 300, the recipient device can prominently display and have an interactive link of the phone number, physical address, e-mail address, web address, and/or other similar personal communication information left in the message. The actions of a selected link would depend on the type of personal communicative information. For example, an audio message may be transmitted in a text format to the recipient device. The original audio message which was transmitted in text format may state: "Hi this is Bob Mouse, my address is 555 Bobby Lane Orlando, Florida and if you have trouble finding my house call me at 555-555-1234." The intelligent message processor can determine that "555-555-1234" is a phone number and "555 Bobby Lane Orlando, Florida" is an address. The recipient device would then prominently display the address and phone number and provide a link under each. The linked phone number, once selected, can direct dial the phone number "555-555-1234", for example. When the address is selected the recipient device can output directions (e.g., audio, text, and/or a map) to "555 Bobby Lane Orlando, Florida", for example, from the current position of the recipient device (i.e., GPS) or some predetermined or entered starting address. The recipient may select the phone number or address via touch, cursor, or other selection method.

Mentioned within the present disclosure are examples of recipient device conditions and recipient preferences (e.g., block 220 and 330). A sender's preference can be taken into account as well. The sender can indicate a certain preference regarding the format of the message. A message device can take into account the sender's preference, recipient's preference, carrier's preference, and/or some other appropriate third party's preference before transmitting a message in a particular format to an end user. For example a sender can prefer that a message be sent to a recipient, for example a truck driver employee of the sender, in an audio format, yet the message was sent via text message while sender was in a meeting. Even though the recipient can prefer messages in text format, especially when the recipient is not moving (e.g., a recipient location condition), the sender can overrule recipients preference, and relay the sender's message to the recipient in an audio format. Appropriateness of overruling a recipient's or other party's preferences can be done by assigning permission levels to recipients, senders, carriers, and/or other appropriate third parties.

Figure 4:
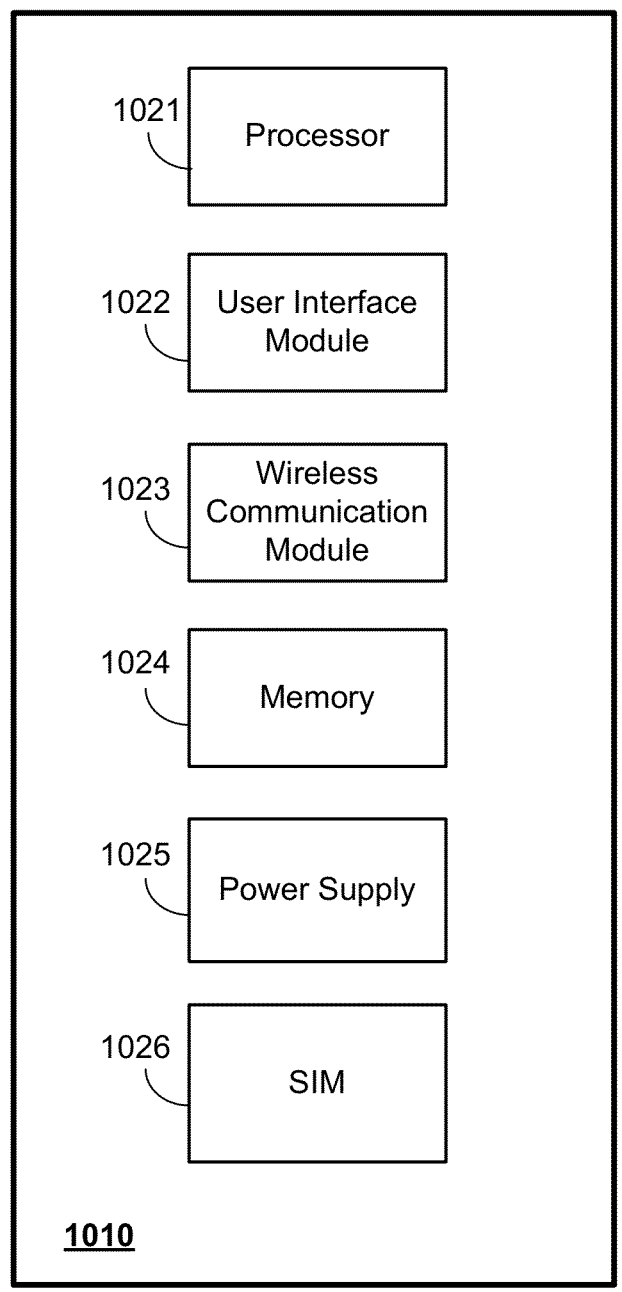
FIG. 4 is a block diagram of a non-limiting, exemplary wireless device that can be used in connection with intelligent message translation services.

FIG. 4 illustrates an example wireless device 1010 that can be used in connection with an embodiment. References will also be made to other figures of the present disclosure as appropriate. For example, devices 120 and 130 can each be a wireless device of the type described in regard to FIG. 4, and can have some, all, or none of the components and modules described in regard to FIG. 4. It will be appreciated that the components and modules of wireless device 1010 illustrated in FIG. 4 are illustrative, and that any number and type of components and/or modules can be present in wireless device 1010. In addition, the functions performed by any or all of the components and modules illustrated in FIG. 4 can be performed by any number of physical components. Thus, it is possible that in some embodiments the functionality of more than one component and/or module illustrated in FIG. 4 can be performed by any number or types of hardware and/or software.

Processor 1021 can be any type of circuitry that performs operations on behalf of wireless device 1010. In one embodiment, processor 1021 executes software (i.e., computer readable instructions stored in a computer readable medium) that can include functionality related to transmitting and receiving telephonic communications including messages of any type, communicating with, operating, or interfacing with messaging systems or running software configured to operate, communicate, or interface with messaging systems, for example. User interface module 1022 can be any type or combination of hardware and/or software that enables a user to operate and interact with wireless device 1010, and, in one embodiment, to interact with a system or software enabling the user to place, request, send and/or receive messages, and/or a system or software enabling the user to view, modify, or delete related software objects. For example, user interface module 1022 can include a display, physical and/or "soft" keys, voice recognition software, microphone, speaker and the like. Wireless communication module 1023 can be any type or combination of hardware and/or software that enables wireless device 1010 to communicate with wireless network equipment. Memory 1024 enables wireless device 1010 to store information, such as preferences regarding message format (e.g., voice, video, multimedia, etc.) and a sender's audio, text, and/or multimedia message. Memory 1024 can take any form, such as internal random access memory (RAM), an SD card, a microSD card and the like. Power supply 1025 can be a battery or other type of power input (e.g., a charging cable that is connected to an electrical outlet, etc.) that is capable of powering wireless device 1010. SIM 1026 can be any type Subscriber Identity Module and can be configured on a removable or non-removable SIM card that allows wireless device 1010 to store data on SIM 1026.

Figure 5:
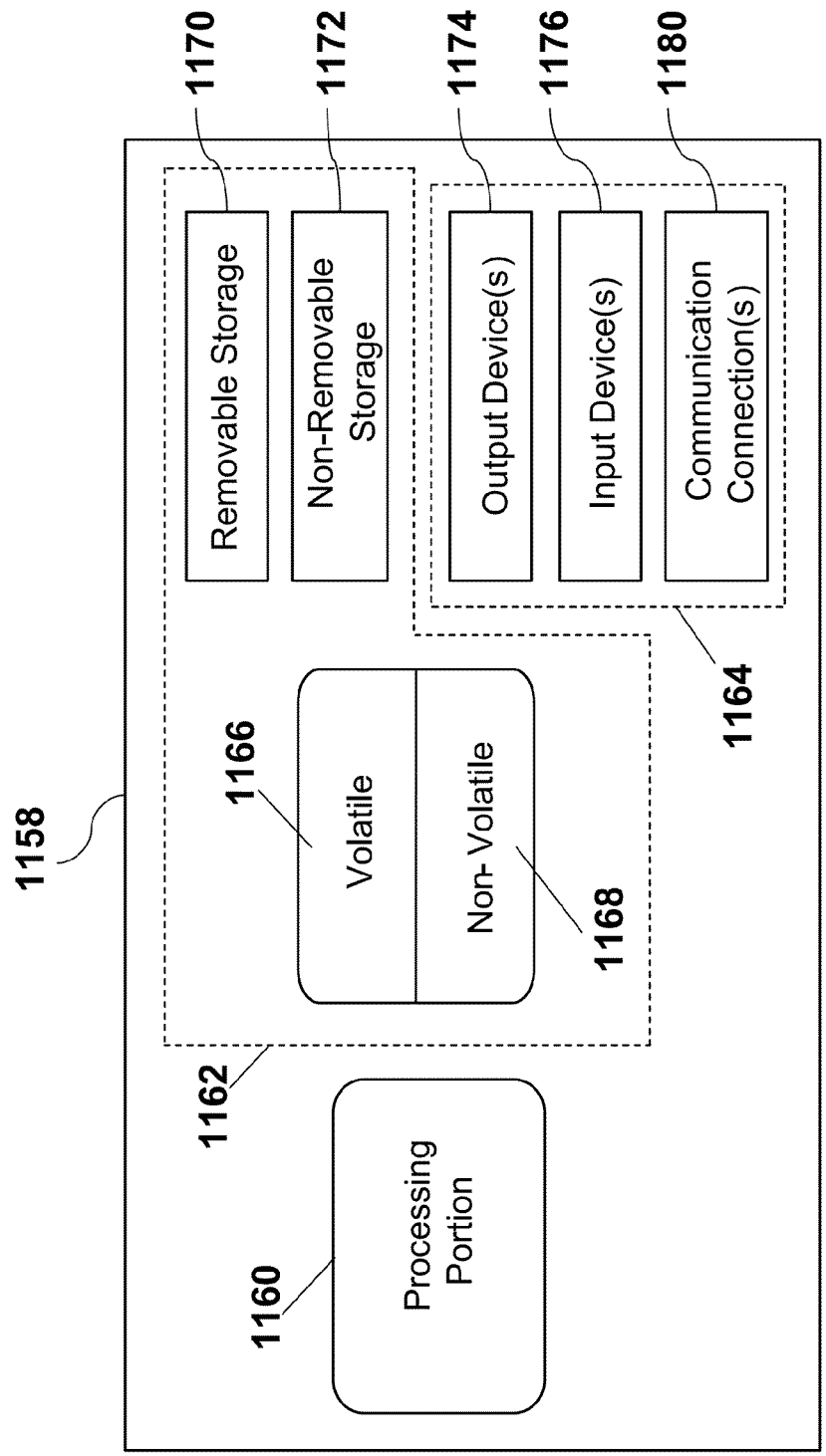
FIG. 5 is a block diagram of a non-limiting, exemplary processor in which intelligent message translation services can be implemented.

FIG. 5 is a block diagram of an example processor 1158 which can be employed in any of the embodiments described herein, including as one or more components of devices 120 and 130, as one or more components of network equipment, voicemail server equipment 110, or related equipment, such as any component shown in FIG. 1, and/or as one or more components of any third party system or subsystem that can implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, receive or convert audio, text, and multimedia messages, determine location information, or perform any other function described herein.

The processor 1158 can be implemented as a client processor and/or a server processor. In a basic configuration, the processor 1158 can include at least one processing portion 1160 and memory portion 1162. The memory portion 1162 can store any information utilized in conjunction with transmitting, receiving, and/or processing voice, data, other telephonic communications, etc. For example, the memory portion is capable of storing call preferences and/or software capable of processing call requests, receiving calls, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media can be part of the processor 1158.

The processor 1158 can also contain the communications connection(s) 1180 that allow the processor 1158 to communicate with other devices, for example through voicemail servers and network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network and nodes illustrated in FIG. 1 can comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how intelligent message translation services can be implemented with stationary and non-stationary network structures and architectures. It can be appreciated, however, that methods and systems for providing intelligent translation and messaging services for audio, text, and/or multimedia messages such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for providing intelligent translation and messaging services for audio, text, and/or multimedia messages can be applied independently of the method of data transport, and do not depend on any particular network architecture, or underlying protocols.

Figure 6:
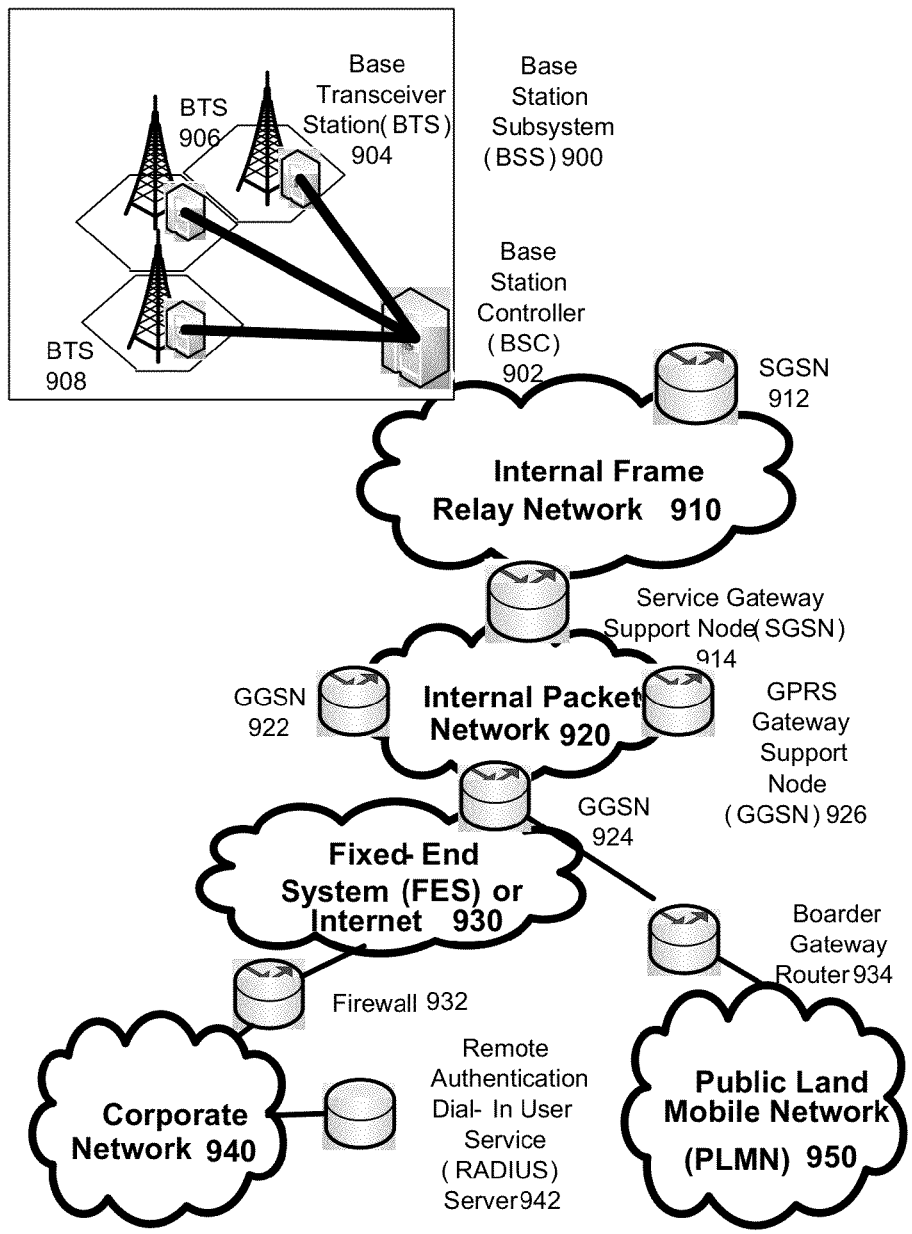
FIG. 6 is an overall block diagram of an exemplary packet-based mobile cellular network environment, such as a GPRS network, in which intelligent message translation services can be implemented.

FIG. 6 depicts an overall block diagram of an exemplary packet-based mobile cellular network environment, such as a GPRS network, in which the systems and methods for providing intelligent translation and messaging services for audio, text, and/or multimedia messages such as those described herein can be practiced. In an example configuration, network 140, 142, and 144 as illustrated in FIG. 1 can be encompassed by or interact with the network environment depicted in FIG. 6. Similarly, device 120, device 130, and voicemail server 110 can communicate or interact with a network environment such as that depicted in FIG. 6. In such an environment, there can be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., devices 120 and 130) become connected to the wireless network. In exemplary fashion, the packet traffic originating from user devices (e.g., devices 120 and 130) can be transported via an over-the-air interface to a BTS 908, and from the BTS 908 to the BSC 902. Base station subsystems, such as BSS 900, can be a part of internal frame relay network 910 that can include Service GPRS Support Nodes (SGSN) such as SGSN 912 and 914. Each SGSN can be connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 can be part of internal packet network 920. Gateway GPRS serving nodes 922, 924 and 926 can provide an interface to external Internet Protocol (IP) networks, such as Public Land Mobile Network (PLMN) 950, corporate intranets 940, or Fixed-End System (FES) or the public Internet 930. As illustrated, subscriber corporate network 940 can be connected to GGSN 924 via firewall 932, and PLMN 950 can be connected to GGSN 924 via border gateway router 934. The Remote Authentication Dial-In User Service (RADIUS) server 942 can be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells can be typically used in urban areas. Pico cells are small cells having a diameter of a few dozen meters. Pico cells can be used mainly indoors. On the other hand, umbrella cells can be used to cover shadowed regions of smaller cells and fill in gaps in coverage between those cells.

Figure 7:
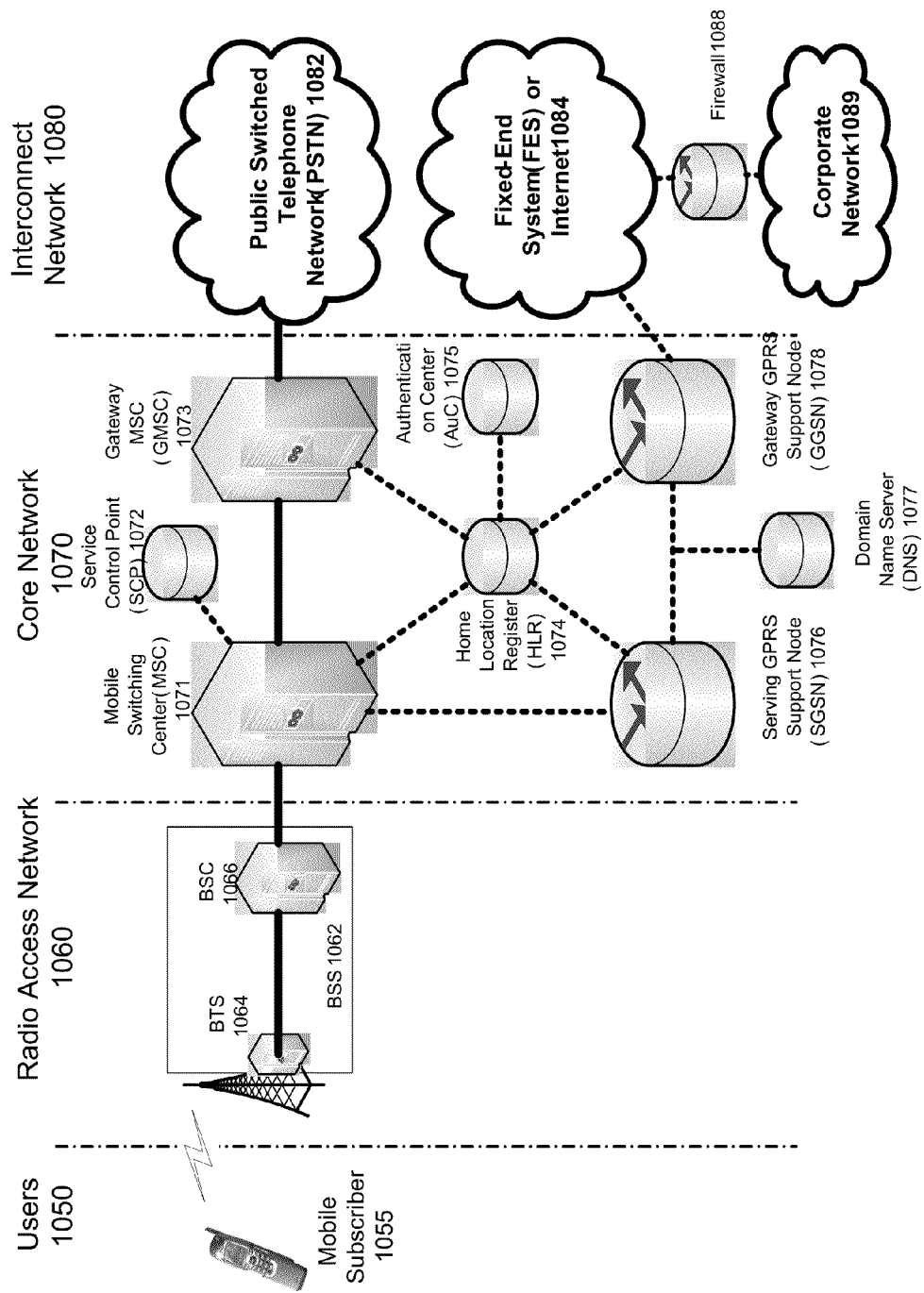
FIG. 7 illustrates a non-limiting, exemplary architecture of a typical GPRS network as segmented into four groups in which intelligent message translation services can be implemented.

FIG. 7 illustrates an architecture of a typical GPRS network segmented into four groups: users 1050, radio access network 1060, core network 1070, and interconnect network 1080. Users 1050 can comprise a plurality of end users (though only mobile subscriber 1055 is shown in FIG. 7). In an example embodiment, the device depicted as mobile subscriber 1055 can comprise devices 120 and 130. Radio access network 1060 comprises a plurality of base station subsystems such as BSSs 1062, which include BTSs 1064 and BSCs 1066. Core network 1070 comprises a host of various network elements. As illustrated here, core network 1070 can comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 can also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center can be connected to a large number of base station controllers. At MSC 1071, for instance, depending on the type of traffic, the traffic can be separated in that voice can be sent to Public Switched Telephone Network (PSTN) 1082 through Gateway MSC (GMSC) 1073, and/or data can be sent to SGSN 1076, which then sends the data traffic to GGSN 1078 for further forwarding.

When MSC 1071 receives call traffic, for example, from BSC 1066, it can send a query to a database hosted by SCP 1072. The SCP 1072 can process the request and can issue a response to MSC 1071 so that it can continue call processing as appropriate.

The HLR 1074 can be a centralized database for users to register to the GPRS network. HLR 1074 can store static information about the subscribers such as the International Mobile Subscriber Identity (IMSI), subscribed services, and a key for authenticating the subscriber. HLR 1074 can also store dynamic subscriber information such as the current location of the mobile subscriber. HLR 1074 can also serve to intercept and determine the validity of destination numbers in messages sent from a device, such as mobile subscriber 1055, as described herein. Associated with HLR 1074 can be AuC 1075. AuC 1075 can be a database that contains the algorithms for authenticating subscribers and can include the associated keys for encryption to safeguard the user input for authentication.

In the following, depending on context, the term "mobile subscriber" sometimes refers to the end user and sometimes to the actual portable device, such as device 120 or 130, used by an end user of a mobile cellular service or a wireless provider. When a mobile subscriber turns on his or her mobile device, the mobile device can go through an attach process by which the mobile device attaches to an SGSN of the GPRS network. In FIG. 7, when mobile subscriber 1055 initiates the attach process by turning on the network capabilities of the mobile device, an attach request can be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 can request more information from mobile subscriber 1055. This information can be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 can notify the old SGSN, to which mobile subscriber 1055 was attached before, to cancel the location process for mobile subscriber 1055. HLR 1074 can then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 can then go through the authentication process. In the authentication process, SGSN 1076 can send the authentication information to HLR 1074, which can send information back to SGSN 1076 based on the user profile that was part of the user's initial setup. The SGSN 1076 can then send a request for authentication and ciphering to mobile subscriber 1055. The mobile subscriber 1055 can use an algorithm to send the user identification (ID) and password to SGSN 1076. The SGSN 1076 can use the same algorithm and compares the result. If a match occurs, SGSN 1076 authenticates mobile subscriber 1055.

Next, the mobile subscriber 1055 can establish a user session with the destination network, corporate network 1089, by going through a Packet Data Protocol (PDP) activation process. Briefly, in the process, mobile subscriber 1055 can request access to the Access Point Name (APN), for example, UPS.com, and SGSN 1076 can receive the activation request from mobile subscriber 1055. SGSN 1076 can then initiate a Domain Name Service (DNS) query to learn which GGSN node has access to the UPS.com APN. The DNS query can be sent to the DNS server within the core network 1070, such as DNS 1077, which can be provisioned to map to one or more GGSN nodes in the core network 1070. Based on the APN, the mapped GGSN 1078 can access the requested corporate network 1089. The SGSN 1076 can then send to GGSN 1078 a Create Packet Data Protocol (PDP) Context Request message that contains necessary information. The GGSN 1078 can send a Create PDP Context Response message to SGSN 1076, which can then send an Activate PDP Context Accept message to mobile subscriber 1055.

Once activated, data packets of the call made by mobile subscriber 1055 can then go through radio access network 1060, core network 1070, and interconnect network 1080, in a particular fixed-end system, or Internet 1084 and firewall 1088, to reach corporate network 1089.

Thus, network elements that can invoke the functionality of providing intelligent translation and messaging services for audio, text, and/or multimedia messages such as those described herein can include but are not limited to Gateway GPRS Support Node tables, Fixed End System router tables, firewall systems, VPN tunnels, and any number of other network elements as required by the particular digital network.

Figure 8:
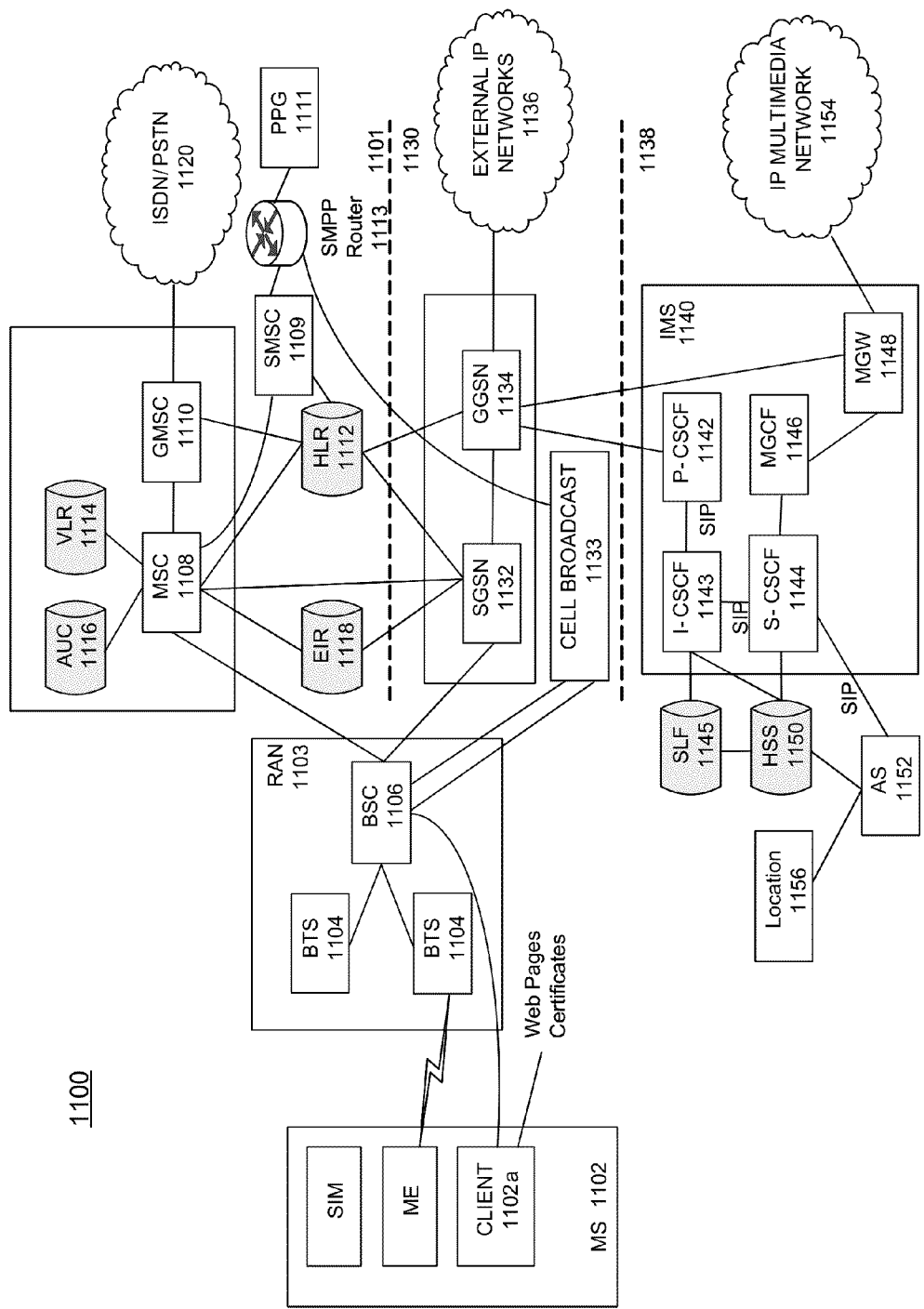
FIG. 8 illustrates a non-limiting alternate block diagram of an exemplary GSM/GPRS/IP multimedia network architecture network in which intelligent message translation services can be implemented.

FIG. 8 illustrates another exemplary block diagram view of a GSM/GPRS/IP multimedia network architecture 1100 in which the systems and methods for providing intelligent translation and messaging services for audio, text, and/or multimedia messages such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., devices 120 and 130) that is used by mobile subscribers, in one embodiment with a Subscriber identity Module (SIM). The SIM includes an International Mobile Subscriber Identity (IMSI), which is a unique identifier of a subscriber. The BTS 1104 can be physical equipment, such as a radio tower, that enables a radio interface to communicate with the MS. Each BTS can serve more than one MS. The BSC 1106 can manage radio resources, including the BTS.

The BSC can be connected to several BTSs. The BSC and BTS components, in combination, are generally referred to as a base station (BSS) or radio access network (RAN) 1103.

The GSM core network 1101 can also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 can perform a switching function for the network. The MSC can also perform other functions, such as registration, authentication, location updating, handovers, and call routing. The GMSC 1110 can provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that can contain administrative information regarding each subscriber registered in a corresponding GSM network. The HLR 1112 can also contain the current location of each MS. The VLR 1114 can be a database that contains selected administrative information from the HLR 1112. The VLR can contain information necessary for call control and provision of subscribed services for each MS currently located in a geographical area controlled by the VLR. The HLR 1112 and the VLR 1114, together with the MSC 1108, can provide the call routing and roaming capabilities of GSM. The AuC 1116 can provide the parameters needed for authentication and encryption functions. Such parameters allow verification of a subscriber's identity. The EIR 1118 can store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 can be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS can first register with the network to indicate its current location by performing a location update and IMSI attach procedure. MS 1102 can send a location update including its current location information to the MSC/VLR, via BTS 1104 and BSC 1106. The location information can then be sent to the MS's HLR. The HLR can be updated with the location information received from the MSC/VLR. The location update can also be performed when the MS moves to a new location area. Typically, the location update can be periodically performed to update the database as location updating events occur.

GPRS network 1130 can be logically implemented on the GSM core network architecture by introducing two packet-switching network nodes, a serving GPRS support node (SGSN) 1132, a cell broadcast and a Gateway GPRS support node (GGSN) 1134. The SGSN 1132 can be at the same hierarchical level as the MSC 1108 in the GSM network. The SGSN can control the connection between the GPRS network and the MS 1102. The SGSN can also keep track of individual MS's locations and security functions and access controls.

Cell Broadcast Center (CBC) 1133 can communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 can provide a gateway between the GPRS network and a public packet network (PDN) or other IP networks 1136. That is, the GGSN can provide interworking functionality with external networks, and set up a logical link to the MS through the SGSN. When packet-switched data leaves the GPRS network, it can be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS can also support simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 can be designed to operate in three network operation modes (NOM1, NOM2 and NOM3). A network operation mode of a GPRS network can be indicated by a parameter in system information messages transmitted within a cell. The system information messages can direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and can include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 can be common to GSM core network 1101, GPRS network 1130 as well as IP multimedia network 1138.

IP multimedia system 1140 can be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 can forward session initiation protocol (SIP) messages received from the MS to an SIP server in a home network (and vice versa) of the MS. The P-CSCF 1142 can also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 can contact subscriber location function (SLF) 1145 to determine which HSS 1150 to use for the particular subscriber, if multiple HSSs 1150 are present. S-CSCF 1144 can perform the session control services for MS 1102. This includes routing originating sessions to external networks and routing terminating sessions to visited networks. S-CSCF 1144 can also decide whether an application server (AS) 1152 is required to receive information on an incoming SIP session request to ensure appropriate service handling. This decision is based on information received from HSS 1150 (or other sources, such as application server 1152). AS 1152 can also communicate to location server 1156 (e.g., a Gateway Mobile Location Center (GMLC)) that provides a position (e.g., latitude/longitude coordinates) of MS 1102.

HSS 1150 can contain a subscriber profile and keep track of which core network node is currently handling the subscriber. It can also support subscriber authentication, accounting, and authorization functions (AAA). In networks with more than one HSS 1150, a subscriber location function provides information on the HSS 1150 that contains the profile of a given subscriber.

MGCF 1146 can provide interworking functionality between SIP session control signaling from the IMS 1140 and ISUP/BICC call control signaling from the external GSTN networks (not shown.) It can also control the media gateway (MGW) 1148 that provides user-plane interworking functionality (e.g., converting between AMR- and PCM-coded voice.) MGW 1148 can also communicate with other IP multimedia networks 1154.

Push to Talk over Cellular (PoC) capable mobile telephones can register with the wireless network when the telephones are in a predefined area (e.g., job site, etc.) When the mobile telephones leave the area, they can register with the network in their new location as being outside the predefined area. This registration, however, does not indicate the actual physical location of the mobile telephones outside the predefined area.

While example embodiments of systems and methods for intelligent translation and messaging services for audio, text, and/or multimedia messages such as those described herein have been described in connection with various communications devices and computing devices/processors, the underlying concepts can be applied to any communications or computing device, processor, or system capable of implementing the messaging systems and methods described. The various techniques described herein can be implemented in connection with hardware or software or, where appropriate, with a combination of both. Thus, the methods and apparatuses for providing intelligent translation and messaging services for audio, text, and/or multimedia messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing messaging services. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing intelligent translation and messaging services for audio, text, and/or multimedia messages as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing intelligent translation and messaging services for audio, text, and/or multimedia messages. When implemented on a general-purpose processor, the program code combines with the processor to provide a unique apparatus that operates to invoke the functionality of a message device intelligent enough to translate audio, text, and/or multimedia messages and transmit them according to available variables. Additionally, any storage techniques used in connection with a distributed node system can invariably be a combination of hardware and software.

While intelligent translation and messaging services for audio, text, and/or multimedia messages has been described in connection with the various embodiments of the various figures, it is to be understood that other similar embodiments can be used or modifications and additions can be made to the described embodiment for performing the same function of providing intelligent translation and messaging services for audio, text, and/or multimedia messages without deviating therefrom. For example, one skilled in the art will recognize that providing intelligent translation and messaging services for audio, text, and/or multimedia messages as described in the present application can apply to any environment, whether wired or wireless, and can be applied to any number of such devices connected via a communications network and interacting across the network. Therefore, providing intelligent translation and messaging services for audio, text, and/or multimedia messages should not be limited to any single embodiment, but rather should be construed in breadth and scope in accordance with the appended claims.

What is claimed is:

1. A method comprising:
    receiving, on a network messaging device, a user preference indicative of being received from a recipient wireless communications device, the user preference comprising a message size;
    receiving, on a network messaging device, a first message intended for delivery to the recipient wireless communications device;
    determining, on the network messaging device, a first size of the first message;
    determining, on the network messaging device, a transmission format of a converted message associated with the first message based on a comparison of the first size of the first message to the message size of the user preference;
    generating the converted message on the network messaging device by converting the first message to the transmission format; and
    transmitting the converted message from the network messaging device to the recipient wireless communications device.

2. The method of claim 1, wherein determining the first size of the first message comprises determining a temporal length of the first message.

3. The method of claim 1, wherein determining the first size of the first message comprises determining a quantity of alphanumeric characters in the first message.

4. The method of claim 1, further comprising determining at least one of a location or a velocity of the recipient wireless communications device.

5. The method of claim 4, wherein determining the transmission format of the converted message is further based on at least one of the location or the velocity of the recipient wireless communications device.

6. The method of claim 1, wherein generating the converted message further comprises:
    determining personal communication information of the first message; and
    including an interactive link that highlights the personal communication information in the converted message.

7. The method of claim 6, wherein:
    when the personal communication information comprises a telephone number, the telephone number is dialed when the interactive link is activated on the recipient wireless communications device; and
    when the personal communication information comprises an address, directions to the address are displayed when the interactive link is activated on the recipient wireless communications device.

8. A network messaging device comprising:
    a memory comprising computer instructions; and
    a processor coupled to the memory, wherein, when executing the computer instructions, the processor effectuates operations comprising:
        receiving a user preference indicative of being received from a recipient wireless communications device, the user preference comprising a message size;
        receiving a first message intended for delivery to the recipient wireless communications device;
        determining a first size of the first message;
        determining a transmission format of a converted message associated with the first message based on a comparison of the first size of the first message to the message size of the user preference;
        generating the converted message by converting the first message to the transmission format; and
        transmitting the converted message to the recipient wireless communications device.

9. The network messaging device of claim 8, wherein the operation of determining the first size of the first message comprises determining a temporal length of the first message.

10. The network messaging device of claim 9, wherein the operation of determining the first size of the first message comprises determining a quantity of alphanumeric characters in the first message.

11. The network messaging device of claim 9, wherein the operations further comprise determining at least one of a location or a velocity of the recipient wireless communications device.

12. The network messaging device of claim 11, wherein the operation of determining the transmission format of the converted message is further based on at least one of the location or the velocity of the recipient wireless communications device.

13. The network messaging device of claim 9, wherein the operation of generating the converted message further comprises:
  determining personal communication information of the first message; and
  including an interactive link that highlights the personal communication information in the converted message.

14. The network messaging device of claim 13, wherein:
  when the personal communication information comprises a telephone number, the telephone number is dialed when the interactive link is activated on the recipient wireless communications device; and
  when the personal communication information comprises an address, directions to the address are displayed when the interactive link is activated on the recipient wireless communications device.

15. A computer-readable storage device comprising executable instructions that when executed by a processor cause the processor to effectuate operations comprising:
  receiving a user preference indicative of being received from a recipient wireless communications device, the user preference comprising a message size;
  receiving a first message intended for delivery to the recipient wireless communications device;
  determining a first size of the first message;
  determining a transmission format of a converted message associated with the first message based on a comparison of the first size of the first message to the message size of the user preference;
  generating the converted message by converting the message to the transmission format; and
  transmitting the converted message to the recipient wireless communications device.

16. The computer-readable storage device of claim 15, wherein the operation of determining the first size of the first message comprises determining a temporal length of the first message.

17. The computer-readable storage device of claim 15, wherein the operation of determining the first size of the first message comprises determining a quantity of alphanumeric characters in the first message.

18. The computer-readable storage device of claim 15, further comprising the operation of determining at least one of a location or a velocity of the recipient wireless communications device.

19. The computer-readable storage device of claim 18, wherein the operation of determining the transmission format of the converted message is further based on at least one of the location or the velocity of the recipient wireless communications device.

20. The computer-readable storage device of claim 15, wherein the operation of generating the converted message further comprises:
  determining personal communication information of the first message; and
  including an interactive link that highlights the personal communication information in the converted message, wherein:
    when the personal communication information comprises a telephone number, the telephone number is dialed when the interactive link is activated on the recipient wireless communications device; and
    when the personal communication information comprises an address, directions to the address are displayed when the interactive link is activated on the recipient wireless communications device.

* * * * *